SUBSCRIPTION TELEVISION SYSTEM

Filed March 28, 1950 4 Sheets-Sheet 1

WALTER S. DRUZ
*INVENTOR.*
BY Francis W. Crotty
HIS ATTORNEY

WALTER S. DRUZ.
INVENTOR.
BY Francis W. Crotty
HIS ATTORNEY

July 17, 1956 W. S. DRUZ 2,755,333

SUBSCRIPTION TELEVISION SYSTEM

Filed March 28, 1950 4 Sheets-Sheet 3

WALTER S. DRUZ.
*INVENTOR.*

BY Francis W. Crotty

HIS ATTORNEY

July 17, 1956 W. S. DRUZ 2,755,333

SUBSCRIPTION TELEVISION SYSTEM

Filed March 28, 1950 4 Sheets-Sheet 4

WALTER S. DRUZ
*INVENTOR.*

BY Francis W. Crotty

HIS ATTORNEY

United States Patent Office 2,755,333

Patented July 17, 1956

2,755,333

SUBSCRIPTION TELEVISION SYSTEM

Walter S. Druz, Chicago, Ill., assignor to Zenith Radio Corporation, a corporation of Illinois Application March 28, 1950, Serial No. 152,468

13 Claims. (Cl. 178—5.1)

This invention relates to television signalling systems of the subscription type in which a television signal is transmitted in coded or scrambled form.

Subscription television systems are disclosed in Patent 2,510,046, Ellett et al., issued May 30, 1950 entitled "Radio-Wire Signalling Systems," and in Patent 2,547,598, Roschke, issued April 3, 1951, entitled, "Image Transmission System," both assigned to the present assignee. The instant invention provides a subscription television system of the general type disclosed in these patents but it has an advantage in that it can be utilized to code a television signal for subscription purposes at a point remote from the point of origin of the television signal. For example, a television signal representing a certain program may originate in one locality and be transmitted in standard uncoded form over a coaxial cable, micro-wave link, or by other means, to another locality where the coding apparatus of the present invention may be positioned and utilized to retransmit this signal in coded form to the surrounding area.

It is, accordingly, an object of the present invention to provide improved apparatus for coding a television signal at some locality remote from the point of origin of this signal, and for retransmitting the television signal in coded form to the surrounding area.

Another object of this invention is to provide such improved apparatus for coding a received conventional television signal in accordance with a coding schedule for retransmission over a first signal channel, and for developing a key signal indicating the coding schedule of the television signal for transmission to subscriber receivers over a second signal channel.

The features of this invention which are believed to be new are set forth with particularity in the appended claims. The invention itself, however, together with further objects and advantages thereof may best be understood by reference to the following description when taken in conjunction with the accompanying drawings, in which:

Figure 1:
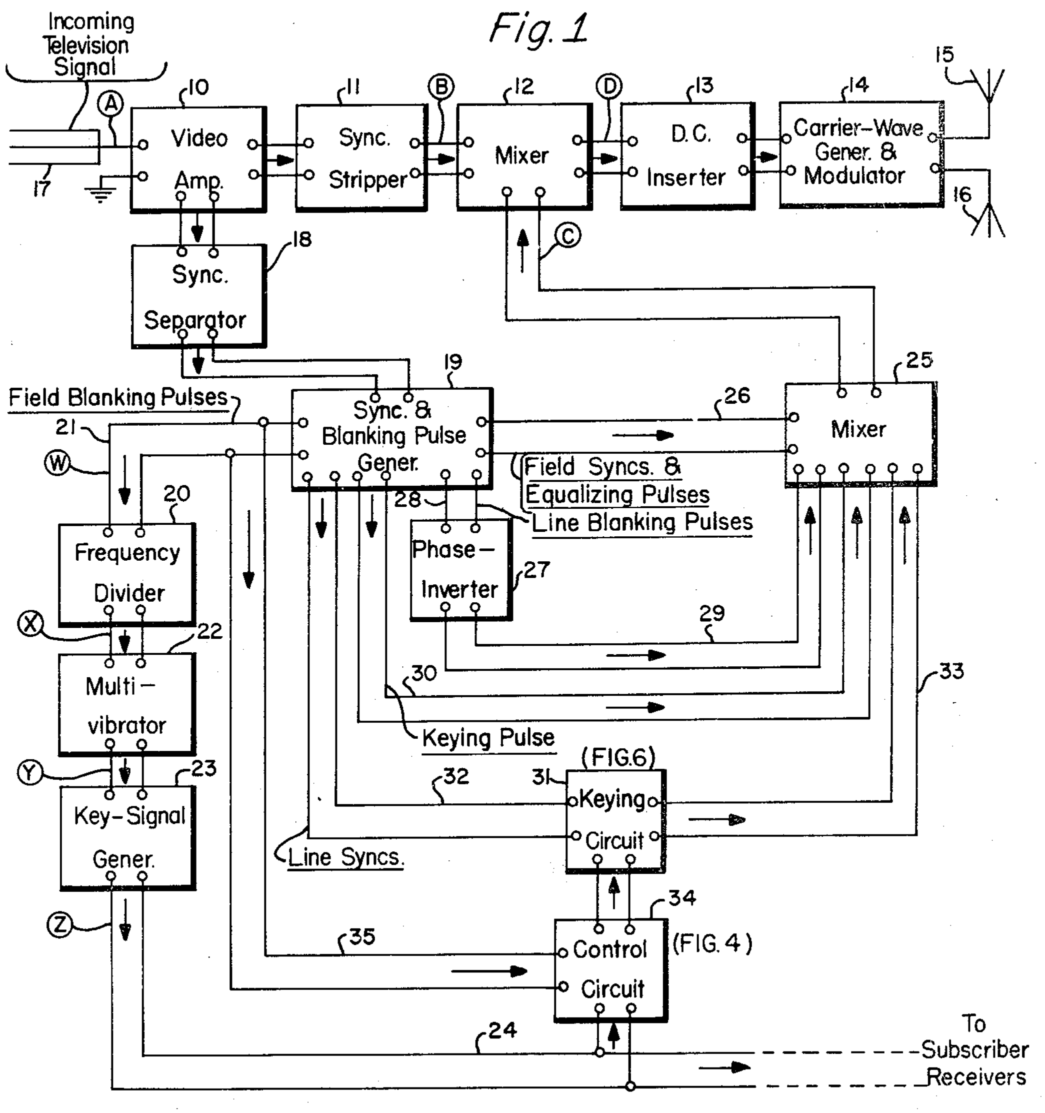
Figure 1 is a schematic representation of a preferred embodiment of the invention, Figures 2 and 3 comprise various wave forms useful in understanding the operation of the system of Figure 1.

The apparatus of Figure 1 may include a video amplifier 10 of any desired number of stages, a synchronizing-signal stripper 11, a mixer amplifier 12, a direct-current component reinserter 13 and a carrier-wave generator and modulator 14. All these stages are of well-known construction and are cascade-connected in usual fashion, as shown. The synchronizing-signal stripper 11 acts as an amplitude-limiter and translates only those components of an applied signal below a preselected amplitude level. The output terminals of the unit 14 may be connected to an appropriate antenna circuit 15, 16. The input terminals of the video amplifier 10 may be connected to a coaxial cable 17 which is utilized to convey video signals in standard uncoded form from a remote point to the apparatus of Figure 1. It is conceivable that the video signals may be conveyed to the apparatus as a modulation of a carrier wave transmitted over a micro-wave link or by other means in which case the video amplifier 10 may be preceded by various stages constituting, a radio-frequency amplifier, a first detector, an intermediate-frequency amplifier and a second detector, as is well known. The sound information associated with the video signals may be conveyed to the system of Figure 1 in usual fashion and may be retransmitted from this system by means of suitable circuits (not shown).

The video amplifier 10 is further connected to a synchronizing-signal separator stage 18 which, in turn, is connected to a synchronizing and blanking pulse generating unit 19. This generating unit may be of any well-known type and may, for example, take the form of any of the systems disclosed in "General Electric Instruction Book" EBI-3125B, published February 1951, by the General Electric Electronics Department, Electronic Park, Syracuse, New York. The synchronizing components of the received signal derived from separator stage 18 are used to synchronize generating unit 19 with these components so that the signals generated by this unit occur in time coincidence with corresponding synchronizing components of the received signal. Field-blanking pulses derived from unit 19 are impressed on a frequency divider stage 20 by way of leads 21. The frequency divider may be of the random type disclosed in Patent 2,588,413 issued to Erwin M. Roschke, March 11, 1952, entitled, "Random Frequency Divider" and assigned to the present assignee. The output terminals of the frequency divider 20 are connected to a multivibrator 22 which is constructed, preferably, to be of the "Eccles-Jordan" type. That is, the multivibrator 22 is constructed so that successive pulses from the divider 20 trigger it from one stable operating condition to another. The multivibrator is connected to a key-signal generator 23, and the output terminals of the key-signal generator are connected to a line circuit 24 extending to subscriber receivers.

Field-synchronizing and equalizing pulses derived from unit 19 are impressed on a mixer amplifier 25 by way of leads 26, and line-blanking pulses from this unit are supplied to the mixer 25 through a phase inverter 27 by way of leads 28 and 29. A keying pulse is also derived from the unit 19 and supplied to mixer 25 over leads 30. This keying pulse acts in well-known manner to key out the line-synchronizing and line-blanking pulses during field-retrace intervals and to key in the field-synchronizing and equalizing pulses during such intervals. Line-synchronizing pulses derived from unit 19 are applied to a keying circuit 31 by means of leads 32, the output terminals of the keying circuit being connected to mixer 25 by leads 33. The keying circuit 31 is to be described in detail hereinafter. The leads 21 are connected to one pair of input terminals of a control circuit 34 by way of leads 35. A second pair of input terminals of the control circuit are connected to the line circuit 24 and the output terminals of the control circuit are connected to the keying circuit 31. The control circuit 34, likewise, is to be described in detail hereinafter. The output terminals of the mixer 25 are connected to the mixer 12.

Figures 2, 3:
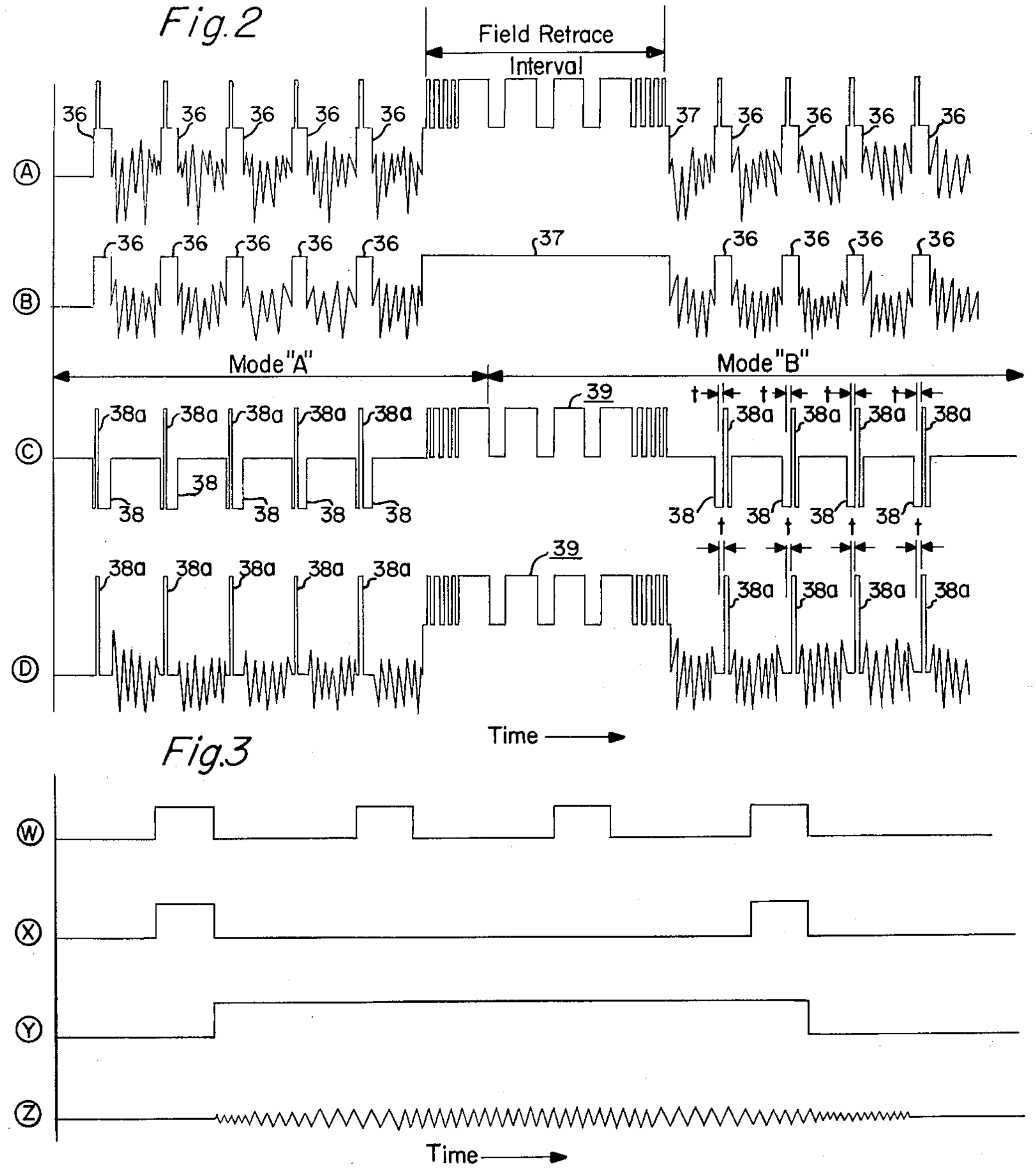

The operation of the system of Figure 1 may be best understood by reference to the wave forms of Figures 2 and 3. A standard uncoded video signal, received over the coaxial cable 17, may be represented by the wave form 2A. The video signal includes line-blanking pulses 36 having line-synchronizing pulses pedestalled thereon and field-blanking pulses 37 having field-synchronizing pulses and equalizing pulses pedestalled thereon, with the picture information occurring between the blanking pulses (as shown). The received signal is amplified in video amplifier 10 and the synchronizing and equalizing pulses are stripped therefrom in the synchronizing-signal stripper 11, so that the signal appearing at the output terminals thereof has the appearance shown in wave form 2B. Synchronizing-signal stripper 11 is well-known per se and may, for example, take the form of the unit type TA–5C disclosed at page 189 of the Radio Corporation of America publication "Broadcast Equipment" 2J6190 (1950) published by the Engineering Products Department at Camden, New Jersey.

The wave form 2C illustrates the composite signal derived at the output terminals of mixer 25. This signal includes phase-inverted line-blanking pulses 38 supplied to the mixer over leads 29 from phase inverter 27, line-synchronizing pulses 38*a* supplied to the mixer over leads 33 from keying circuit 31, and field-synchronizing pulses and equalizing pulses 39 supplied to the mixer over leads 26. As previously stated, the field synchronizing and equalizing pulses 39 are keyed in and the line-blanking pulses 38 and synchronizing pulses 38*a* are keyed out during field-retrace intervals by means of the keying pulse supplied to mixer 25 over leads 30.

In accordance with one embodiment of the invention, and in a manner to be described, the timing of the line-synchronizing pulses 38*a* relative to the other components of the television signal is altered during spaced intervals by a preselected time *t*. That is, the time relation between the line-synchronizing pulses and the other components of the signal is altered between two predetermined values. When this time relation has one certain value, the system is considered to be operating in a mode A, and when it has a second value, the system is considered to be operating in a mode B.

The composite signal from mixer 25 is combined with the stripped signal from unit 11 in the mixer amplifier 12 and the signal appearing at the output terminals thereof is shown in wave form 2D. This signal is appropriately adjusted as to backgroud level in unit 13, modulated on a suitable carrier wave in modulator 14, and radiated by means of antenna circuit 15, 16. The radiated signal is effectively coded in that the timing of the line-synchronizing pulses 38*a* relative to the other components of the signal is altered by a preselected time *t* during mode B as compared with the timing of these synchronizing pulses during mode A and the signal composition changes from mode to mode in accordance with a coding schedule that may be entirely random in nature. Moreover, the line-blanking pulses 36 that formerly appeared in the television signal now have a reduced amplitude and appear in the amplitude range normally preserved exclusively for video information in order to prevent synchronization of unauthorized receivers by means of these blanking pulses. More specifically, the amplitude of the phase-inverted line-blanking pulses 38 is, preferably, made such that upon combination of these phase-inverted blanking pulses with the line-blanking pulses 36 in mixer 12, the resulting signal amplitude corresponds to the gray-level of the television signal.

The manner in which the operation of the system of Figure 1 is altered from one mode to the other will now be described. The field-blanking pulses derived from unit 19 and impressed on frequency divider 20 by way of leads 21 are indicated in the wave form 3W. These pulses are frequency-divided in stage 20, producing output pulses, such as those represented by the wave form 3X. The frequency-divided pulses are used to trigger multivibrator 22, as previously described, the signal obtained therefrom being shown in wave form 3Y. Multivibrator 22 has step type amplitude variations or pulses which are used to trigger key-signal generator 23. Bursts of key signal, such as the burst shown in wave form 3Z, are derived from the key-signal generator in response to the multivibrator pulses, and are transmitted to subscriber receivers over the line circuit 24. As shown in Figure 3, each burst of key signal of the wave form 3Z is initiated by the leading edge of each pulse of wave form 3Y, and each key-signal burst begins to decay at the lagging edge of each of these pulses.

The bursts of key signal are also impressed on control circuit 34 and, in a manner to be described, condition this circuit so that the next field-blanking pulse on leads 35 succeeding the initiation of such a key-signal burst causes the control signal to apply an actuating signal to keying circuit 31. The keying circuit acts in response to such actuating signal, in a manner also to be described, to alter the timing of pulses appearing on leads 33 relative to the line-synchronizing pulses appearing on leads 32 from a first preselected value to a second preselected value and, thus, shifts the operation of the system from one mode to the other. The system continues to operate in the other mode until the termination of the individual key-signal burst. At such termination, control circuit 34 is again conditioned so that the next succeeding field-blanking pulse on leads 35 actuates the keying circuit to effect a change in mode back to the first mode.

In this manner, since actuation of keying circuit 31 occurs in response to field-blanking pulses on leads 35, changes in mode of the system occur during field-retrace intervals. Therefore, any discontinuities that might be introduced into the radiated signal due to these mode changes are prevented from causing distortion or impairment of the image reproduced by subscriber receivers. Moreover, since the changes in mode occur during field-retrace intervals following the initiation and termination of each key-signal burst and not at the instant of such initiation and termination, slight delays in the transmission of the bursts that might occur in line circuit 24 need not interfere with synchronization between the system of Figure 1 and the subscriber receivers. The keying circuit 31 and control circuit 34 together constitute the coding apparatus of the system of Figure 1.

Figures 4, 5:
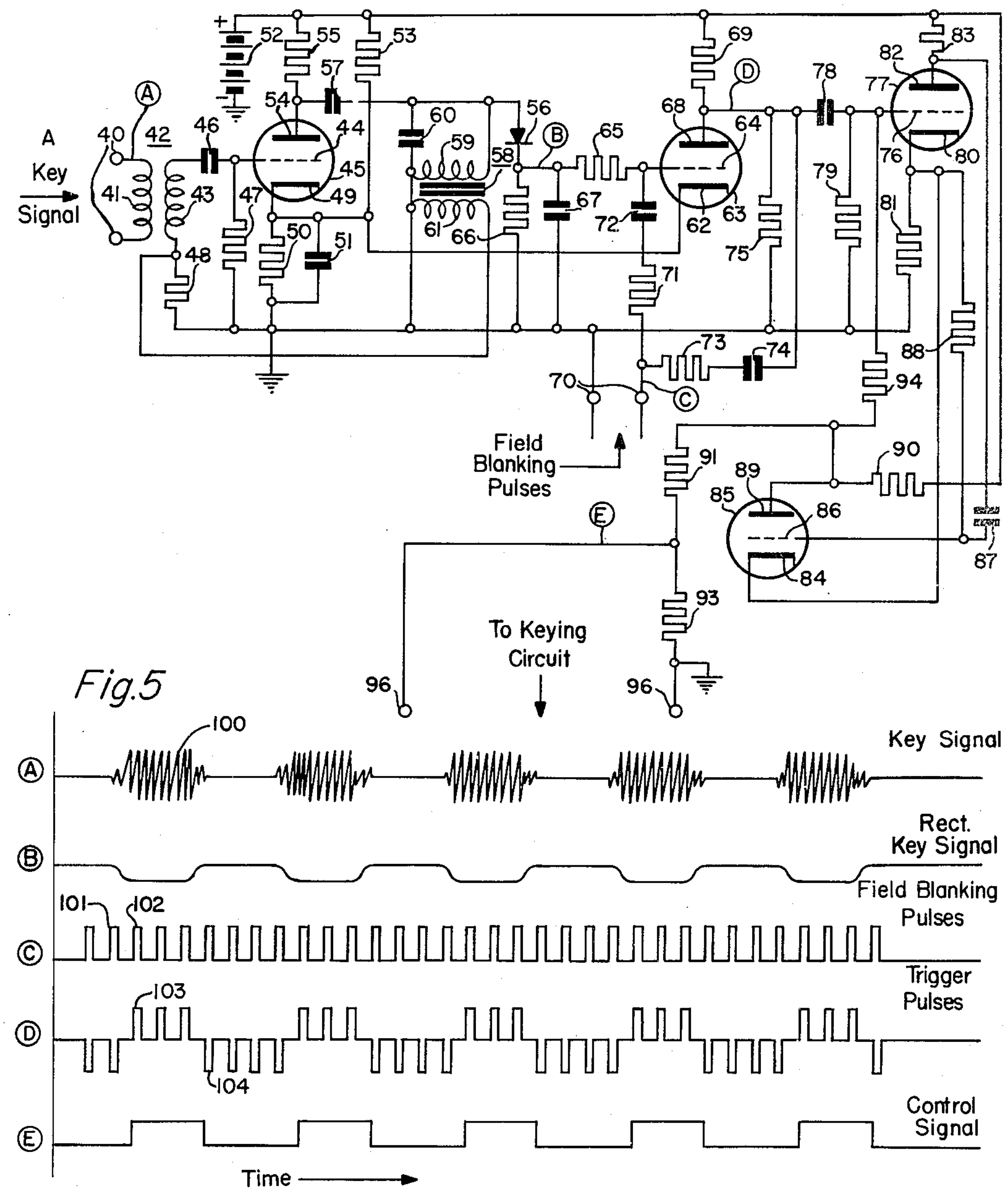
Figure 4 is a detailed circuit diagram of one component of the system of Figure 1, Figure 5 comprises various wave forms useful in understanding the operation of the circuit of Figure 4.

A detailed diagram of control circuit 34 is shown in Figure 4. This control circuit, in conjunction with keying circuit 31, is disclosed and claimed in copending application Serial No. 79,432, Cotsworth et al., filed March 3, 1949, and issued March 24, 1953 as Patent 2,632,799, entitled "Decoding Apparatus For Television Receiver" and in copending application Serial No. 341,681, filed March 11, 1953 in the name of Pierce E. Reeves, both of which are assigned to the present assignee. The control circuit comprises a pair of input terminals 40 which are connected to the line circuit 24 so that key-signal bursts occurring on this line circuit may be applied to the control circuit. The terminals 40 are further connected to the primary winding 41 of a coupling transformer 42. One terminal of the secondary winding 43 of transformer 42 is coupled to the control electrode 44 of an electron-discharge device 45 through a coupling capacitor 46, the control electrode being connected to ground through a grid-leak resistor 47. The other terminal of the secondary winding 43 is connected to ground through a resistor 48. The cathode 49 of discharge device 45 is connected to ground through a biasing resistor 50 shunted by a by-pass capacitor 51, the cathode 49 being further connected to the positive terminal of a source of unidirectional potential 52 through a resistor 53. The anode 54 of device 45 is connected to the positive terminal of the source 52 through a load resistor 55 and to one side of a rectifying device 56 through a coupling capacitor 57.

The device 45 acts as amplifier for the key-signal bursts and its sensitivity is increased by means of regeneration which is provided by a transformer 58. One terminal of the primary winding 59 of the transformer 58 is directly connected to the junction of the capacitor 57 and rectifying device 56, and the other terminal of this winding is connected directly to ground and also is coupled to the aforementioned junction through a capacitor 60. One terminal of the secondary winding 61 of the transformer 58 is connected to ground, the other terminal being connected to the junction of resistor 48 and winding 43. The cathode 49 of discharge device 45 is directly connected to cathode 62 of an electron-discharge device 63, and the other side of the rectifying device 56 is connected to the control electrode 64 of device 63 through a resistor 65. The rectifying device 56 is also connected to ground by means of a resistor 66 connected to the junction of device 56 and resistor 65, resistor 66 being shunted by a capacitor 67. The anode 68 of device 63 is connected to the positive terminal of the source 52 through a load resistor 69.

Field-blanking pulses from unit 19 of Figure 1 are supplied by way of leads 35 to a further pair of input terminals 70 of the control circuit. One of the terminals 70 is connected to ground and the other is coupled to the control electrode 64 through a series-connected resistor 71 and capacitor 72, this latter terminal being further coupled to the anode 68 of device 63 through a series-connected resistor 73 and capacitor 74. The anode 68 is connected to ground through a resistor 75, and is further coupled to the control electrode 76 of an electron-discharge device 77 through a capacitor 78, the control electrode being connected to ground through a grid-leak resistor 79. The cathode 80 of device 77 is connected to ground through a biasing resistor 81, and the anode 82 of this device is connected to the positive terminal of source 52 through a load resistor 83. The cathode 80 of device 77 is connected to the cathode 84 of an electron-discharge device 85, and the anode 82 of device 77 is coupled to the control electrode 86 of device 85 through a coupling capacitor 87, the latter control electrode being connected to the cathode 84 through a resistor 88. The anode 89 of device 85 is connected to the positive terminal of source 52 through a load resistor 90, and this anode is connected to ground through series-connected resistors 91 and 93. The junction of anode 89 of device 85 and the resistor 91 is connected to the control electrode 76 of device 77 through a balancing resistor 94. The junction of resistors 91 and 93 is connected to one of a pair of output terminals 96, the other being connected to ground. The output terminals 96 are connected to the keying circuit 31 of Figure 1. The devices 77 and 85 are connected to form a single-shot multivibrator and, in a manner to be described, this multivibrator develops an actuating signal across the terminals 96 in response to the signals applied across terminals 40 and 70.

The operation of the circuit of Figure 4 may best be understood by reference to Figure 5. Bursts of key signal shown in the wave form 5A and which appear in line circuit 24 are impressed across terminals 40. As previously pointed out, it is desired that control circuit 34 develop an actuating signal for keying circuit 31 during field-retrace intervals to avoid distorting the television image reproduced by subscriber receivers. As also previously pointed out, it is desirable that the actuation of keying circuit 31 take place during the field-retrace intervals succeeding the initiation and termination of each key-signal burst to allow for delays that might occur in the line circuit 24. This is accomplished in the control circuit of Figure 4, in the following manner:

The bursts of key signal impressed across terminals 40 are amplified by discharge device 45. As previously pointed out, the amplifier is made regenerative by reason of the connections of the transformer 58 and resistor 48 which act to supply a portion of the output signal of the device back to its control electrode 44 in proper phase to provide regeneration. To preclude low-amplitude noise signals and the like from affecting the decoding apparatus, the amplifier is constructed to respond only to signals above a certain threshold amplitude level by reason of the positive bias on cathode 49 due to the potentiometer arrangement of the resistors 53 and 50. The amplified key-signal bursts from device 45 are recited in rectifying device 56 and negative-polarity pulses as shown in the wave form 5B appear across resistor 66.

The field-blanking pulses derived from unit 19 of Figure 1 and impressed across the terminals 70 are shown in the wave form 5C. During the intervals between the negative-polarity pulses of wave form 5B, device 63 is conductive to translate the field-blanking pulses. The device 63 is arranged to have, preferably, an amplification factor of two and the amplified field-blanking pulses are supplied thereby to control electrode 76 of device 77 as negative-polarity pulses of twice their original amplitude. However, the positive-polarity field-blanking pulses are directly supplied to control electrode 76 by means of the circuit including resistor 73 and capacitor 74. Therefore, the net result during such intervals between the negative-polarity pulses of wave form 5B is that negative-polarity pulses are supplied to control electrode 76 with an effective amplitude substantially equal to the field-blanking pulses.

Now consider the effect of a burst of key signal, such as the burst 100 of wave form 5A, applied to terminals 40 of the control circuit. This burst is initiated by a frequency-divided pulse from divider 20 corresponding to the field-blanking pulse 101 of wave form 5C. The burst of key signal is rectified to produce the negative-polarity pulse shown in the wave form 5B, which pulse renders device 63 non-conductive to field-blanking pulses impressed across terminals 70. Due to the finite time required for each key-signal burst to reach an amplitude sufficient for translation by the circuit of device 45, device 63 is not rendered non-conductive to the field-blanking pulse 101 but reaches the non-conductive state before the occurrence of the next succeeding field-blanking pulse 102 so that this latter pulse is not translated by device 63.

As long as device 63 is maintained in its non-conductive state, the field-blanking pulses are applied to control electrode 76 of device 77 solely by the circuit branch 73, 74 and with positive polarity. At the termination of each key-signal burst, such as the burst 100 of wave form 5A, the succeeding field-blanking pulses are translated by device 63 and effectively negative-polarity pulses are again applied to the control electrode 76. The pulses applied to this last-mentioned control electrode are shown in the wave form 5D. The curves demonstrate that upon the initiation of each key-signal burst (see wave form 5A) succeeding pulses such as the pulse 103 appear with positive polarity, and upon termination of each key-signal burst succeeding pulses such as the pulse 104 appear with negative polarity at the electrode 64.

As previously stated, discharge devices 77 and 85 are connected to constitute a conventional single-shot multivibrator circuit. Assume that in the initial state of the multivibrator circuit device 85 is conductive and device 77 is non-conductive. The multivibrator remains in this initial state until a positive polarity pulse, such as the pulse 103 of wave form 5D, triggers the multivibrator into its secondary state. Positive pulses immediately succeeding the pulse 103 have no effect on the multivibrator, but the next succeeding negative pulse, such as the pulse 104, acts to return the multivibrator to its initial state.

Therefore, an actuating signal for the keying circuit 31 of Figure 1, such as shown in the curve 5E, is obtained across the resistor 93 and, thus across output terminals 96. This actuating signal has amplitude changes determined by the respective field-blanking pulses immediately succeeding the initiation and termination of the individual bursts of key signal carried by line circuit 24, and is impressed across the terminals 105 of the keying circuit to actuate this keying circuit and change the mode of operation of the system as previously mentioned.

Figures 6, 7:
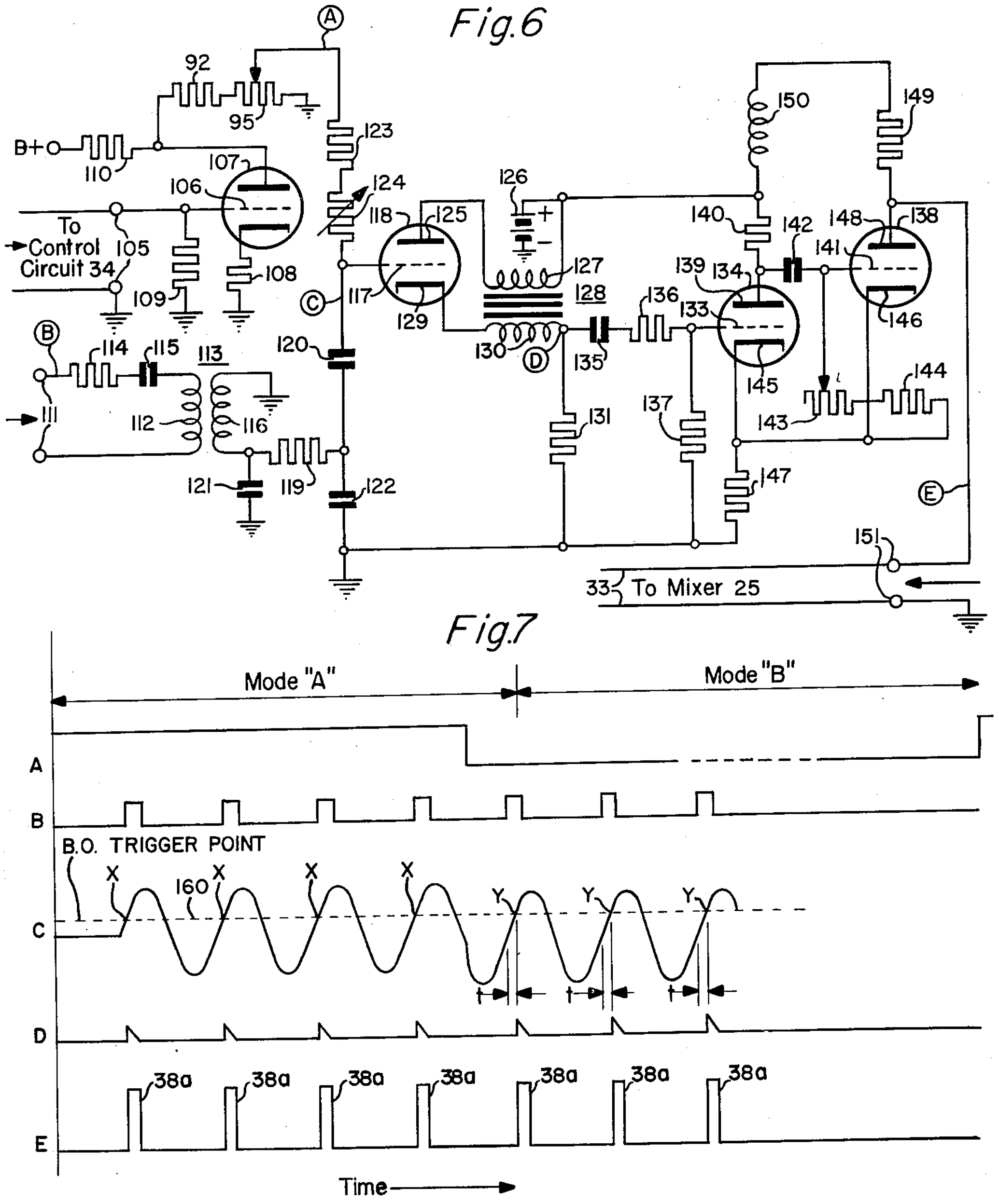
Figure 6 shows a detailed diagram of another component of the system of Figure 1, and, Figure 7 shows various wave forms useful in understanding the operation of the circuit of Figure 6.

The keying circuit is shown in detail in Figure 6 and includes a pair of input terminals 111 which are connected to the unit 19 of Figure 1 by way of leads 32 so that line-synchronizing pulses may be impressed across these terminals. The terminals 111 are further coupled to the primary winding 112 of a transformer 113 through a series-connected resistor 114 and coupling capacitor 115. The transformer 113 includes a secondary winding 116, one side of this secondary winding being grounded and the other coupled to the control electrode 117 of an electron-discharge device 118 through a series-connected resistor 119 and capacitor 120. A capacitor 121 is shunted across the winding 116 to form therewith a resonant network tuned to the repetition frequency of the line-synchronizing pulses. The junction of resistor 119 and capacitor 120 is coupled to ground by a capacitor 122, the resistor 119 and capacitor 122 forming a phase-shifting network for purposes to be described.

One of the terminals 105 is connected to ground and the other is connected to the control electrode 106 of an electron-discharge device 107, the control electrode being connected to ground through a grid-leak resistor 109. The cathode of device 107 is connected to ground through resistor 108, and the anode of this device is connected to the positive terminal B+ of a source of unidirectional potential through a load resistor 110. The anode of device 107 is further connected to ground through series-connected resistors 92 and 95, which form a potentiometer across the unidirectional source with the resistor 110. A movable tap on resistor 95 is connected to the control electrode 117 of device 118 through series-connected resistor 123 and adjustable resistor 124. The device 118 is connected to form a conventional blocking oscillator. The anode 125 of the device is connected to the positive terminal of a source of unidirectional potential 126 through a winding 127 of transformer 128. The cathode 129 of the device 118 is coupled to ground through a further winding 130 of the transformer 128 and a series-connected resistor 131. The junction of the resistor 131 and winding 130 is coupled to control electrode 133 of an electron-discharge device 134 through series-connected coupling capacitor 135 and resistor 136, control electrode 133 being connected to ground through a grid-leak resistor 137. The device 134 and a further electron-discharge device 138 are connected to form a multivibrator circuit of the single-shot type. The anode 139 of device 134 is connected to the positive terminal of the source 126 through a load resistor 140 and to the control electrode 141 of device 138 through a coupling capacitor 142, the control electrode being connected to cathodes 145, 146 through series-connected adjustable resistor 143 and resistor 144. The cathode 145 of the device 134 is directly connected to the cathode 146 of device 138, and these cathodes are connected to ground through a common resistor 147. The anode 148 of device 138 is connected to the positive terminal of the source 126 through a series-connected resistor 149 and radio-frequency choke coil 150. The anode 148 is also connected to one of the output terminals 151 of the keying circuit, the other terminal being grounded. The output terminals 151 are connected to the mixer amplifier 25 of Figure 1 by way of the leads 33.

The operation of the keying circuit of Figure 6 may best be understood by reference to the wave forms of Figure 7. The actuating signal derived from the control circuit 34 of Figure 1 is impressed across the terminals 105. The actuating signal is phase inverted by the device 107 and appears in the anode circuit thereof with the polarity shown in wave form 7A. The actuating signal of wave form 7A corresponds to the signal shown in the wave form 5E of Figure 5, but is illustrated in Figure 7 on an expanded time base for purposes of clarity. The line-synchronizing pulses derived from unit 19 of Figure 1, and impressed across terminals 111 over leads 32, are shown by the wave form 5B. These synchronizing pulses are impressed across the winding 112 of transformer 113 through the series-connected resistor 114 and capacitor 115, and excite the tuned network 116, 121 to develop a sine wave whose frequency corresponds to the repetition frequency of the line-synchronizing pulses. This sine wave is phase-shifted in the network 119, 122 and, together with the actuating signal of wave form 7A, is impressed upon the control electrode 117 of blocking-oscillator discharge device 118. The combined signal impressed on this control electrode is shown in the wave form 7C, and this signal acts to trigger the blocking oscillator. The triggering point of the blocking oscillator is shown by the dotted line 160 associated with the wave form 7C, and the position of this triggering point may be adjusted by adjustment of resistor 124 since this resistor, together with the resistors 123 and 95 forms the discharge path of capacitor 120 and, hence, determines the time constant of the blocking oscillator. Whenever the signal on control electrode 117 increases in a positive direction to exceed the value indicated by the dotted line 160, the blocking oscillator is actuated from one state to the other. Therefore, during the intervals between the negative-polarity pulses of wave form 7A, the signal shown in wave form 7C triggers the blocking oscillator at points designated "x," the position of the points "x" being adjusted by means of the variable resistor 124. On the other hand, during the occurrence of the negative polarity pulses, the signal of wave form 7C triggers the blocking oscillator at the points designated "y." Therefore, during the intervals of the negative-polarity pulses of the actuating signal the timing of the blocking oscillator is delayed a preselected time interval designated "t" determined by the amplitude of these pulses. The value of the time interval "t" may be varied by adjustment of the potentiometer 95, since this adjustment controls the amplitude of the pulses of the actuating signal of wave form 7A applied to the control electrode 117 of device 118.

Each time the blocking oscillator is triggered, a pulse such as those shown in the wave form 7D appears in the cathode circuit of device 118 across the resistor 131. The timing of the pulses of wave form D is changed whenever the mode of operation of the system of Figure 1 changes, and these pulses are used to trigger the multivibrator formed by the circuit of the device 134 and 138. The time constant of the multivibrator may be adjusted by means of the variable resistor 143, and this adjustment is made such that pulses, shown in the wave form 7E, appear across the output terminals 151 of the keying circuit with an individual duration preferably equal to the individual duration of the line-synchronizing pulses of the received television signal.

The phase-shifting network 119, 122 of Figure 6 acts to shift the phase of the signal of wave form 7C relative to the line-synchronizing pulses of wave form 7B by a predetermined amount so that in mode A the pulses of wave form 7E occur in time coincidence with corresponding line-synchronizing pulses of wave form 7B, and are delayed by the time "t" with respect to corresponding line-synchronizing pulses during mode B. The pulses of wave form 7E correspond to the pulses 38*a* of wave forms 2C and 2D of Figure 2. The phase-shifting network 119, 122 is constructed and the blocking oscillator is adjusted so that in mode A the pulses 38*a* preferably occur in the blanking pulses 38 in the wave form 2C in a position in accordance with present day standards, and so that in mode B these pulses 38*a* occur in the blanking pulses 38 but displaced from the respective standard positions thereof by the afore-mentioned time-delay "t." The construction of the phase-shifting network 119, 122 and adjustment of the blocking oscillator is preferably such that in both modes the pulses 38*a* remain within the confines of the corresponding blanking pulses 38 to assure that the resulting peak amplitude of the pulses 38a is substantially invariable regardless of mode, as shown in the wave form 2D. This operating condition arises since the peak amplitude of the pulses 38a is utilized in unit 13 of Figure 1 to insert the proper direct-current component into the radiated television signal.

This invention provides, therefore, a system for retransmitting a received uncoded television signal in coded form for subscription purposes. The coded television signal which is retransmitted by the described embodiment of the invention includes video components and synchronizing components having their time relation with respect to each other altered during spaced operating intervals.

Moreover, the system provides means for reducing the amplitude of the blanking pulses contained in the received television signal so that reproduction of the retransmitted coded television signal in unauthorized receivers by synchronization on these pulses is precluded. In addition, the system provides for the generation of a key signal indicating the coding schedule of the coded television signal, this key signal being transmitted to subscriber receivers to enable such receivers to reproduce the information contained in the retransmitted and coded television signal.

It is to be understood that while the described system causes the timing of the synchronizing components of the retransmitted television signal to be varied by a fixed preselected amount relative to video components of the television signal during spaced operating intervals, such variations may be effected continually in accordance with a sine wave or other type of coding signal. To accomplish this, the control circuit 34 is constructed to supply such coding signal to the keying circuit 31 so that this latter circuit changes the timing of the local line-synchronizing components continuously in accordance with the characteristics of the coding signal.

It is to be further understood that the system may be simplified in that the synchronizing components of the received television signal derived from the separator 18 may be acted on directly by the coding apparatus 31, 34. This eliminates the need for the generating unit 19, this unit being shown in the described system as a convenient means for reconstituting all the synchronizing components of the television signal and with the line-blanking reduced in amplitude to the "gray" level of the video components.

While a particular embodiment of the invention has been shown and described, modifications may be made and it is intended in the appended claims to cover all such modification as fall within the true spirit and scope of the invention.

I claim:

1. A subscription television system for retransmitting in coded form a received uncoded television signal including in alternation video components and synchronizing-signal components having an amplitude greater than said video components, said system comprising: an input circuit upon which said uncoded television signal is impressed; a video signal source coupled to said input circuit and including a synchronizing-signal stripper stage for deriving a video signal including said video components but excluding said synchronizing components of said received signal; a synchronizing-signal source coupled to said input circuit for deriving local synchronizing components corresponding in time to those of said received signal; a mixer amplifier coupled to said signal sources for reconstituting a television signal including in alternation video components and synchronizing compoents; coding apparatus disposed between said mixer amplifier and at least one of said sources and responsive to an applied actuating signal for altering the time relation between at least one of said components of said reconstituted signal and the corresponding component of said received signal to effect coding of said reconstituted signal; means coupled to said coding apparatus for applying a control signal thereto to effect actuation of said apparatus in accordance with a coding schedule; and means coupled to said mixer amplifier for transmitting said reconstituted signal.

2. A subscription television system for retransmitting in coded form a received uncoded television signal including in alternation video components and synchronizing-signal components having an amplitude greater than said video components, said system comprising: an input circuit upon which said uncoded television signal is impressed; a video signal source coupled to said input circuit and including a synchronizing-signal stripper stage for deriving a video signal including said video components but excluding said synchronizing components of said received signal; a synchronizing-signal source coupled to said input circuit for deriving local synchronizing components corresponding in time to those of said received signal; a mixer amplifier coupled to said signal sources for reconstituting a television signal including in alternation video components and synchronizing components; coding apparatus disposed between said mixer amplifier and at least one of said sources to alter during spaced operating intervals the time relation between one of said components of said reconstituted signal and the corresponding component of said received signal to effect coding of said reconstituted signal; a key-signal generator coupled to said coding apparatus for effecting actuation thereof during said spaced intervals; means coupled to said generator for transmitting a key signal indicating said spaced intervals over a first signal channel; and means coupled to said mixer amplifier for transmitting said reconstituted signal over a second signal channel.

3. A subscription television system for retransmitting in coded form a received uncoded television signal including in alternation video components and synchronizing-signal components having an amplitude greater than said video components, said system comprising: an input circuit upon which said uncoded television signal is impressed; a video signal source coupled to said input circuit and including a synchronizing-signal stripper stage for deriving a video signal including said video components but excluding said synchronizing components of said received signal; a synchronizing-signal source coupled to said input circuit for deriving local synchronizing components corresponding in time to those of said received signal; a mixer amplifier coupled to said signal sources for reconstituting a television signal including in alternation video components and synchronizing components; coding apparatus disposed between said mixer amplifier and said synchronizing-signal source to vary the timing of said synchronizing components of said reconstituted signal during spaced operating intervals by a preselected amount as compared with said synchronizing components of said received signal to effect coding of said reconstituted signal; a key-signal generator coupled to said coding apparatus for effecting actuation thereof during said spaced intervals; means coupled to said generator for transmitting a key signal indicating said spaced intervals over a first signal channel; and means coupled to said mixer amplifier for transmitting said reconstituted signal over a second signal channel.

4. A subscription television system for retransmitting in coded form a received uncoded television signal including in alternation video components and synchronizing components having an amplitude greater than said video components, said system comprising: an input circuit upon which said uncoded television signal is impressed; a synchronizing signal stripper coupled to said input circuit for removing said synchronizing components from said uncoded received signal; means for supplying local synchronizing components occurring in substantial time coincidence with said synchronizing components of said uncoded received signal; coding apparatus coupled to said means and responsive to an applied actuating signal for varying the timing of said local synchronizing components with respect to said synchronizing components of said received signal; means coupled to said coding apparatus for applying a control signal thereto to effect actuation of said apparatus in accordance with a coding schedule; a mixer amplifier coupled to said stripper stage and to said coding apparatus for producing a coded television signal in which said video components and said local synchronizing components occur in alternation and with a varying time relation determined by said coding schedule; and means coupled to said mixer amplifier for transmitting said coded television signal over a selected signal channel.

5. A subscription television system for retransmitting in coded form a received uncoded television signal including in alternation video components and synchronizing components having an amplitude greater than said video components, said system comprising: an input circuit upon which said uncoded television signal is impressed; a synchronizing-signal stripper stage coupled to said input circuit for removing said synchronizing components from said uncoded received signal; a synchronizing-signal source coupled to said input circuit for producing local synchronizing components occurring in substantial time coincidence with said synchronizing components of said uncoded received signal; coding apparatus coupled to said source and responsive to an applied actuation signal for altering the timing of said local synchronizing components with respect to said synchronizing components of said received signal; means coupled to said coding apparatus for applying a control signal thereto to effect actuation of said apparatus in accordance with a coding schedule; a mixer amplifier coupled to said stripper stage and to said coding apparatus for producing a coded television signal in which said video components and said local synchronizing components occur in alternation and with a time relation that is altered in accordance with said coding schedule; and means coupled to said mixer amplifier for transmitting said coded television signal over a selected signal channel.

6. A subscription television system for retransmitting in coded form a received uncoded television signal including in alternation video components and synchronizing components having an amplitude greater than said video components, said system comprising: an input circuit upon which said uncoded television signal is impressed; a synchronizing-signal stripper stage coupled to said input circuit for removing said synchronizing components from said uncoded received signal; a synchronizing-signal source for producing local synchronizing components occurring in substantial time coincidence with said synchronizing components of said received signal; coding apparatus coupled to said source for altering the timing of said local synchronizing components with respect to said synchronizing components of said received signal during spaced operating intervals in accordance with a coding schedule; a key-signal generator coupled to said coding apparatus for effecting actuation thereof during said spaced intervals; means coupled to said generator for transmitting a key signal indicating said spaced operating intervals over a first signal channel; a mixer amplifier coupled to said stripper stage and to said coding apparatus for producing a coded television signal in which said video components and said local synchronizing components occur in alternation and with a time relation that is altered in accordance with said coding schedule during said spaced operating intervals; and means coupled to said mixer amplifier for transmitting said coded television signal over a second signal channel.

7. A subscription television system for retransmitting in coded form a received uncoded television signal including in alternation video components and synchronizing components having an amplitude greater than said video components, said system comprising: an input circuit upon which said uncoded television signal is impressed; a synchronizing-signal stripper stage coupled to said input circuit for removing said synchronizing components from said uncoded received signal; a synchronizing-signal source for producing local synchronizing components occurring in substantial time coincidence with said synchronizing components of said received signal; coding apparatus coupled to said source and responsive to an applied actuating signal for altering the timing of said local synchronizing components with respect to said synchronizing components of said received signal; means including a key-signal generator coupled to said source for supplying a control signal representing a coding schedule to said coding apparatus to effect actuation thereof and for generating a key signal indicating said coding schedule for transmission over a first signal channel; a mixer amplifier coupled to said stripper stage and to said coding apparatus for producing a coded television signal in which said video components and said local synchronizing components occur in alternation and with a time relation that is altered in accordance with said coding schedule; and means coupled to said mixer amplifier for transmitting said coded television signal over a second signal channel.

8. A subscription television system for retransmitting in coded form a received uncoded television signal including in alternation video components and line- and field-synchronizing components individually having an amplitude greater than said video components, said system comprising: an input circuit upon which said uncoded television signal is impressed; a synchronizing-signal stripper stage coupled to said input circuit for removing said synchronizing components from said received signal; a synchronizing-signal source for producing local line- and field-synchronizing components occurring in substantial time coincidence with said synchronizing components of said received signal; a keying circuit coupled to said source and responsive to an actuating signal for altering the timing of said local line-synchronizing components with respect to said line-synchronizing components of said received signal by a preselected amount; a control circuit coupled to said source and responsive to the joint application of said local field-synchronizing components and of a key signal for supplying a control signal to said keying circuit to effect actuation thereof during spaced operating intervals; a key-signal generator coupled to said control circuit for generating a key signal for application to said control circuit and for transmission over a first signal channel; a mixer amplifier coupled to said stripper stage, to said synchronizing-signal source, and to said keying circuit for producing a coded television signal in which said video components and said local field- and line-synchronizing components occur in alternation and with a time relation between said line-synchronizing components and said field and video components that is altered during said spaced intervals; and means coupled to said mixer amplifier for transmitting said coded television signal over a second signal channel.

9. A subscription television system for retransmitting in coded form a received uncoded television signal including in alternation video components and line- and field-synchronizing components individually having an amplitude greater than said video components, said system comprising: an input circuit upon which said uncoded television signal is impressed; a synchronizing-signal stripper stage coupled to said input circuit for removing said synchronizing components from said received signal; a generating unit for producing local line- and field-synchronizing components occurring in substantial time coincidence with said synchronizing components of said received signal; a keying circuit coupled to said generating unit and responsive to an actuating signal for altering the timing of said local line-synchronizing components with respect to said line-synchronizing components of said received signal by a preselected amount; a control circuit coupled to said generating unit and responsive to the joint application of said local field-synchronizing components and a key signal for supplying a control signal to said keying circuit to effect actuation thereof during spaced operating intervals; a key-signal generator coupled to said control circuit for generating a key signal for application to said control circuit and for transmission over a first signal channel; a first mixer amplifier coupled to said generating unit and to said keying circuit for producing a composite signal in which said local field-synchronizing components and local line-synchronizing components occur with a time relation that is altered by said preselected amount during said spaced operating intervals; a second mixer amplifier coupled to said first mixer and to said stripper stage for producing a coded television signal including in alternation said video components and said composite signal; and means coupled to said second mixer amplifier for transmitting said coded television signal over a second signal channel.

10. A subscription television system for retransmitting in coded form a received uncoded television signal including in alternation video components, and blanking and synchronizing components pedestalled one on the other and having a combined amplitude greater than said video components, said system comprising: an input circuit upon which said uncoded television signal is impressed; a synchronizing-signal stripper stage coupled to said input circuit for removing said synchronizing components from said received signal; a generating unit coupled to said input circuit for producing local synchronizing components and blanking components of like polarity and in time coincidence with corresponding components of said received signal; a phase inverter coupled to said generating unit for inverting the phase of said local blanking components; coding apparatus coupled to said generating unit for altering the timing of said local synchronizing components with respect to said synchronizing components of said received signal by a preselected amount during spaced operating intervals; mixer apparatus coupled to said stripper stage, to said phase inverter and to said coding apparatus for producing a coded television signal in which said video components, combined local and received blanking components, and said local synchronizing components occur in alternation with a time relation that is altered by said preselected amount during said spaced operating intervals; and means coupled to said mixer amplifier for transmitting said coded television signal over a selected signal channel.

11. A subscription television system for retransmitting in coded form a received uncoded television signal including in alternation video components, and blanking and synchronizing components pedestalled one on the other and having a combined amplitude greater than said video components, said system comprising: an input circuit upon which said uncoded television signal is impressed; a synchronizing-signal stripper stage coupled to said input circuit for removing said synchronizing components from said received signal; a generating unit for producing local synchronizing components and blanking components of like polarity and in time coincidence with corresponding components of said received signal; a phase inverter coupled to said generating unit for inverting the phase of said local blanking components; coding apparatus coupled to said generating unit for altering the timing of said local synchronizing components with respect to said synchronizing components of said received signal by a preselected amount during spaced operating intervals; a key-signal generator coupled to said coding apparatus for effecting actuation thereof during said spaced intervals and for transmitting a key signal indicating said spaced operating intervals over a first signal channel; a mixer amplifier coupled to said stripper stage, to said phase inverter and to said coding apparatus for producing a coded television signal in which said video components, combined local and received blanking components, and said local synchronizing components occur in alternation with a time relation that is altered by said preselected amount during said spaced operating intervals; and means coupled to said mixer amplifier for transmitting said coded television signal over a second signal channel.

12. A subscription television system for retransmitting in coded form a received uncoded television signal including in alternation video components, and blanking and synchronizing components pedestalled one on the other and having a combined amplitude greater than said video components, said system comprising: an input circuit upon which said uncoded television signal is impressed; a synchronizing-signal stripper stage coupled to said input circuit for removing said synchronizing components from said received signal; a generating unit for producing local synchronizing components and blanking components of like polarity and in time coincidence with corresponding components of said received signal; a phase inverter coupled to said generating unit for inverting the phase of said local blanking components; coding apparatus coupled to said generating unit responsive to a key signal for altering the timing of said local synchronizing components with respect to said components of said received signal by a preselected amount; a key-signal generator coupled to said generating unit and to said coding apparatus for effecting actuation thereof during spaced operating intervals; means coupled to said key-signal generator for transmitting a key signal indicating said spaced operating intervals over a signal channel; a mixer amplifier coupled to said stripper stage, to said phase inverter and to said coding apparatus for producing a coded television signal in which said video components, combined local and received blanking components, and said local synchronizing components occur in alternation with a time relation that is altered by said preselected amount during said spaced operating intervals; and means coupled to said mixer amplifier for transmitting said coded television signal over a second signal channel.

13. A subscription television system for retransmitting in coded form a received uncoded television signal including video components and synchronizing components, said system comprising: an input circuit upon which said received uncoded television signal is impressed; circuit means coupled to said input circuit for deriving one of the components of said received uncoded signal; a mixer amplifier coupled to said circuit means and to said input circuit for reconstituting a television signal including video components and synchronizing components; coding apparatus coupled to said circuit means and responsive to an applied actuating signal for varying the relative timing of the video and synchronizing components of said reconstituted signal as compared with the corresponding components of said received uncoded signal to effect coding of said reconstituted signal; means coupled to said coding apparatus for applying a control signal thereto to effect actuation of said apparatus in accordance with a coding schedule; and means coupled to said mixer amplifier for transmitting said reconstituted signal.

References Cited in the file of this patent

UNITED STATES PATENTS

| | | |
|---|---|---|
| 2,286,450 | White | June 16, 1942 |
| 2,492,943 | White | Dec. 27, 1949 |
| 2,612,552 | Crotty et al. | Sept. 20, 1952 |
| 2,632,799 | Cotsworth et al. | Mar. 24, 1953 |